US006574602B1

(12) United States Patent
Absar et al.

(10) Patent No.: US 6,574,602 B1
(45) Date of Patent: Jun. 3, 2003

(54) DUAL CHANNEL PHASE FLAG DETERMINATION FOR COUPLING BANDS IN A TRANSFORM CODER FOR HIGH QUALITY AUDIO

(75) Inventors: Mohammed Javed Absar, Singapore (SG); Sapna George, Singapore (SG); Antonio Mario Alvarez-Tinoco, Singapore (SG)

(73) Assignee: STMicroelectronics Asia Pacific PTE Limited, Singapore (SG)

(*) Notice: Subject to any disclaimer, the term of this patent is extended or adjusted under 35 U.S.C. 154(b) by 0 days.

(21) Appl. No.: 09/581,779

(22) PCT Filed: Dec. 19, 1997

(86) PCT No.: PCT/SG97/00075

§ 371 (c)(1),
(2), (4) Date: Sep. 8, 2000

(87) PCT Pub. No.: WO99/33194

PCT Pub. Date: Jul. 1, 1999

(51) Int. Cl.[7] .......................... G10L 19/02; H04B 1/66; H04S 1/00
(52) U.S. Cl. .................... 704/504; 704/200.1; 704/205; 704/229
(58) Field of Search ....................... 704/200.1, 205.229, 704/504

(56) References Cited

U.S. PATENT DOCUMENTS

| | | | | | |
|---|---|---|---|---|---|
| 5,491,773 A | * | 2/1996 | Veldhuis et al. | ............ | 704/229 |
| 5,539,829 A | * | 7/1996 | Lokhoff et al. | ................ | 381/2 |
| 5,606,618 A | * | 2/1997 | Lokhoff et al. | ................ | 381/2 |
| 5,621,855 A | * | 4/1997 | Veldhuis et al. | ............ | 704/229 |
| 5,632,005 A | * | 5/1997 | Davis et al. | ................ | 704/504 |
| 5,636,324 A | * | 6/1997 | Teh et al. | ................... | 704/226 |
| 5,703,999 A | * | 12/1997 | Herre et al. | ................. | 704/203 |
| 5,812,672 A | * | 9/1998 | Herre et al. | .................... | 381/2 |
| 5,812,971 A | * | 9/1998 | Herre et al. | ................. | 704/230 |
| 5,850,418 A | * | 12/1998 | Van De Kerkhof | ......... | 375/240 |
| 5,873,065 A | * | 2/1999 | Kagiri | ......................... | 704/500 |
| 5,909,664 A | * | 6/1999 | Davis et al. | ................. | 704/229 |
| 5,956,674 A | * | 9/1999 | Smyth et al. | ............... | 704/229 |
| 5,974,380 A | * | 10/1999 | Smyth et al. | ................ | 704/229 |
| 6,341,165 B1 | * | 1/2002 | Gbur et al. | .................... | 381/23 |

FOREIGN PATENT DOCUMENTS

EP 0 563 832 A1 * 10/1993 ............ H04H/5/00

OTHER PUBLICATIONS

Advanced Television Systems Committee (ATSC) Digital Audio Compression (AC-3) Standard, Doc. A/52, Dec. 20, 1995, p. 1–130.*
Steve Vernon, "Design and Implementation of AC-3 Coders," IEEE Trans. Consumer Electronics, vol. 41, No. 3, Aug. 1995, p. 754–759.*

* cited by examiner

Primary Examiner—Tālivaldis Ivars Šmits
(74) Attorney, Agent, or Firm—Lisa K. Jorgenson; Robert Iannucci; Seed IP Law Group PLLC

(57) ABSTRACT

A method and apparatus for subband phase flag determination for coupling of channels in a dual channel audio encoder is based on a psychoacoustic model of the human auditory system. The method and apparatus are applicable to audio encoders which utilize a coupling channel to combine certain frequency components of the input audio signals. The method ensures a least square error between the original channel frequency coefficients at the encoder and the estimated coefficients at the decoder by determining the sign of the dot product of the coefficients for one of the channels and the coupling coefficients. No restriction is placed on the strategy utilized for generating the coupling channel coefficients or the coupling coordinates.

17 Claims, 3 Drawing Sheets

DUAL CHANNEL PHASE FLAG DETERMINATION FOR COUPLING BANDS IN A TRANSFORM CODER FOR HIGH QUALITY AUDIO

RELATED APPLICATIONS

This application is related to concurrently filed allowed copending patent application Ser. No. 09/582,552, which is a national stage entry of application PCT/SG97/00076, METHOD AND APPARATUS FOR ESTIMATION OF COUPLING PARAMETERS IN A TRANSFORM CODER FOR HIGH QUALITY AUDIO, filed Dec. 27, 1997.

TECHNICAL FIELD

This invention relates in general to digital signal processing of audio signals, such as music signals. More particularly, the invention relates to the implementation of a high quality dual-channel digital audio encoder, based on the psychoacoustic model of the human auditory system, for digital storage or transmission.

BACKGROUND ART

In order to more efficiently broadcast or record audio signals, the amount of information required to represent the audio signals may be reduced. In the case of digital audio signals, the amount of digital information needed to accurately reproduce the original pulse code modulation (PCM) samples may be reduced by applying a digital compression algorithm, resulting in a digitally compressed representation of the original signal. The goal of the digital compression algorithm is to produce a digital representation of an audio signal which, when decoded and reproduced, sounds the same as the original signal, while using a minimum of digital information for the compressed or encoded representation.

Recently, the use of psychoacoustic models in the design of audio coders has led to high compression ratios while keeping audible degradation in the compressed signal to a minimum. Description of one such method can be found in the Advanced Television Systems Committee (ATSC) Standard document entitled "Digital Audio Compression (AC-3) Standard", Document A/52, Dec. 20, 1995. In the basic approach, the time domain signal is first converted to frequency domain using a bank of filters. Frequency domain masking of human auditory system is then exploited to maximise perceived fidelity of the signal transmitted at a given bit-rate.

Further compression can be successively obtained by use of a well known technique called coupling. Coupling takes advantage of the way the human ear determines directionality for very high frequency signals, in order to allow a reduction in the amount of data necessary to code an audio signal. At high audio frequency (approximately above 2 KHz) the ear is physically unable to detect individual cycles of an audio waveform, and instead responds to the envelope of the waveform. Consequently, the coder combines the high frequency coefficients of the individual channels to form a common coupling channel. The original channels combined to form the said coupling channel are referred to as coupled channels.

A basic encoder can form the coupling channel by simply taking the average of all the individual channel coefficients. A more sophisticated encoder can alter the sign of individual channels before adding them into the sum so as to avoid phase cancellations.

The generated coupling channel is next sectioned into a number of frequency bands. Frequency sub-bands are grouped together to form coupling bands. For each such band and each coupled channel a coupling co-ordinate is transmitted to the decoder. To obtain the high frequency coefficients in any frequency band, for a particular coupled channel, from the said coupling channel, the decoder multiplies the coupling channel coefficients in that frequency band by the coupling co-ordinate of that channel for that particular frequency band. For a dual channel implementation of such a decoder, a phase flag bit may also be provided for each coupled band of the coupling channel. A final step of phase-correction is then performed, by the decoder, in which the coefficients in each band are multiplied by the phase flag bit for that band.

The standard does not outline any specific method for determination of the phase flag bits. Ad hoc methods do exist but, due to their very nature, do not guarantee any assured performance, nor can be relied upon to provide minimum error between the original coefficients at encoder and the reconstructed, phase corrected, coefficients at the decoder.

SUMMARY OF THE INVENTION

The phase flag for a band is, essentially, a function of the coefficients of the original channel and the coefficients of the coupling channel, in that band. Embodiments of the invention aim to minimise the difference between the original coefficients at the encoder and the reconstructed coefficients at the decoder.

In accordance with the present invention, there is provided a method for computing a phase reconstruction coefficient in a dual channel digital audio encoder having first and second encoded channels and a coupling channel, comprising computing transform coefficients for said first and second channels, computing coupling coefficients from the transform coefficients of the first and second channels, and computing a dot product of the corresponding transform coefficients for one of the first and second channels and the coupling coefficients, and determining the sign of the computed dot product.

The present invention also provides a method for computing a phase reconstruction coefficient in a dual channel digital audio encoder having first and second encoded channels and a coupling channel, comprising determining transform coefficients for one of the first and second channels, determining coupling coefficients from the first and second channels, and computing the sign of the sum of corresponding transform and coupling coefficients over a predetermined frequency range of the coefficients.

Preferably the method includes computing a phase reconstruction coefficient for each of a plurality of coupling frequency bands for said one of the first and second channels.

Preferably the phase reconstruction coefficient computation is independent of a method used for computing the coupling coefficients, and independent of a method used for computing coupling coordinates for said first and second channels.

The present invention also provides a dual channel encoder for coding of audio information which generates a coupling channel with at least one coupling band, comprising means for computing a dot product of input channel transform coefficients and coupling channel coefficients in said at least one coupling band, and means for determining the sign of said dot product for use as a phase flag corresponding to the at least one coupling band.

The present invention also provides a dual channel encoder for coding of audio information which generates a coupling channel and phase estimation data such that a difference between original coupled channel coefficients generated at the encoder and channel coefficients estimated at a compatible decoder have a least square error.

There is further provided, in accordance with the present invention, an encoder for transform coding digital audio information from first and second channels, the encoder producing a coupling channel arranged in at least one frequency band and at least one phase flag corresponding to the at least one frequency band, wherein the at least one phase flag is computed according to:

$$\text{phase flag} = \text{sign}(\Sigma(b_i * c_i))$$

wherein $b_i$ represents transform coefficients for one of the first and second channels, $c_i$ represents transform coefficients for the coupling channel, and index i extends over the frequency range of the band.

BRIEF DESCRIPTION OF THE DRAWINGS

The invention is described in greater detail hereinbelow, by way of example only, through description of an embodiment thereof and with reference to the accompanying drawings, wherein.

DETAILED DESCRIPTION OF THE PREFERRED EMBODIMENTS

Figure 1:
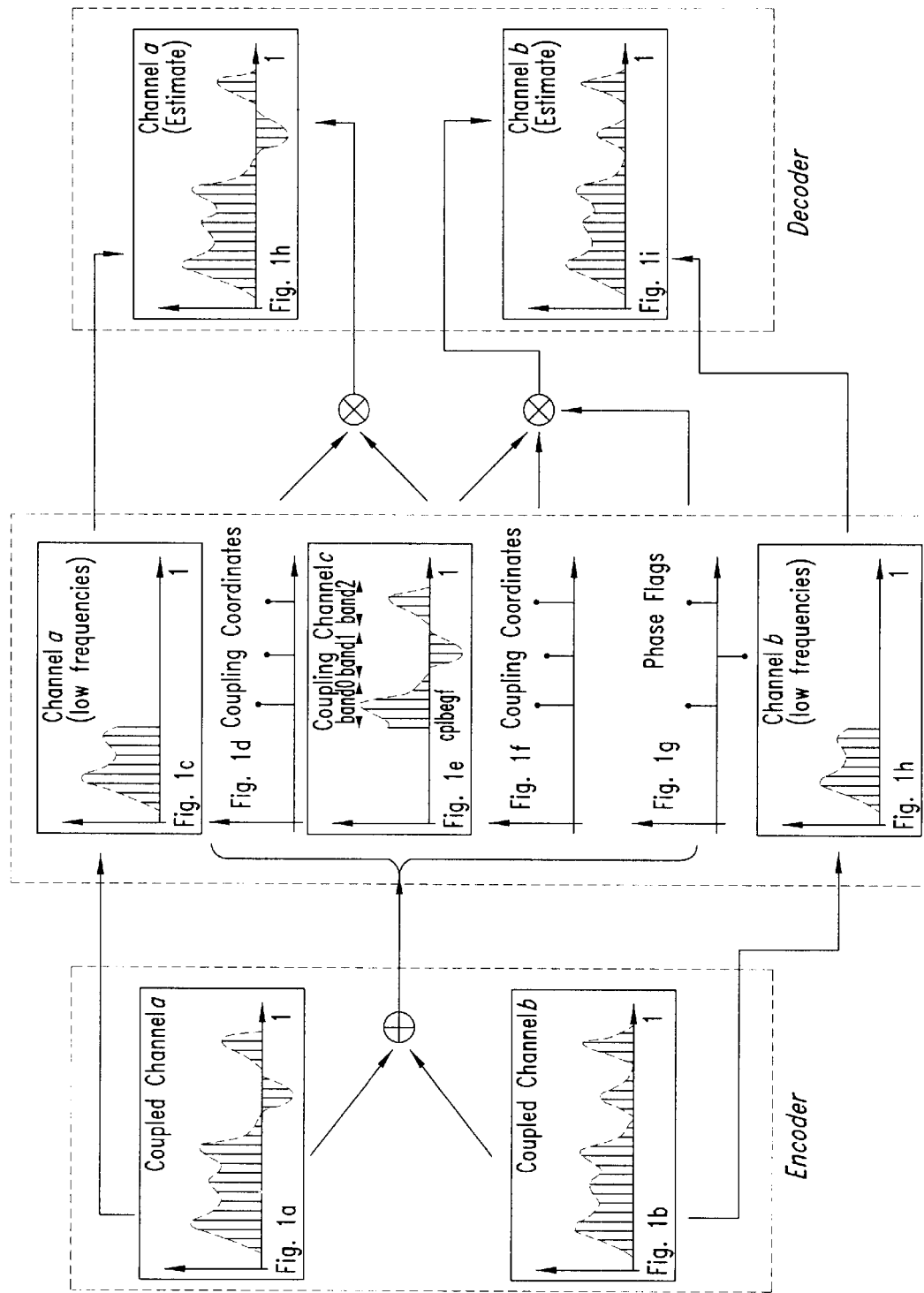
FIG. 1 is a diagrammatic illustration of an audio encoding/decoding process including channel coupling and phase reconstruction.

As mentioned, one method for compression of digital audio signals is described in the ATSC Standard entitled "Digital Audio Compression (AC-3) Standard", (Document A/52, Dec. 20, 1995), and the contents of that document are expressly incorporated herein by reference. The following description of a preferred embodiment of the invention is presented in the context of an audio encoder which is compatible with the AC-3 Standard.

An AC-3 encoder accepts PCM audio and produces an encoded bit stream consistent with the AC-3 standard. The specifics of the audio encoding process are not normative requirements of the standard, but a compatible encoder must produce a bit stream matching the syntax set out in the AC-3 standard document, which, when decoded as specified, produces audio of sufficient quality for the intended application.

The AC-3 algorithm achieves high coding gain (the ratio of the input bit-rate to the output bit-rate) by coarsely quantizing a frequency domain representation of the audio signal. The basic encoding process is as follows. The first step in the encoding process is to transform the representation of audio from a sequence of PCM time samples into a sequence of blocks of frequency coefficients. This is done in the analysis filter bank. Overlapping blocks of 512 time samples are multiplied by a time window and transformed into the frequency domain. Due to the overlapping blocks, each PCOM input sample is represented in two sequential transformed blocks. The frequency domain representation may then be decimated by a factor of two so that each block contains 256 frequency coefficients. The individual frequency coefficients are represented in binary exponential notation as a binary exponent and a mantissa. The set of exponents is encoded into a coarse representation of the signal spectrum which is referred to as the spectral envelope. This spectral envelope is used by a core bit allocation routine which determines how many bits to use to encode each individual mantissa. The spectral envelope and the coarsely quantized mantissas for 6 audio blocks (1536 audio samples) are formatted into an AC-3 frame. The AC-3 bit stream is a sequence of AC-3 frames.

Channel coupling is performed during encoding by averaging certain transform coefficients across channels that are included in the coupling channel. Each coupled channel has a unique set of coupling coordinates which are used to preserve the high frequency envelopes of the original channels. The coupling process is performed for transform coefficients corresponding to frequencies above a coupling frequency that is defined by a pre-specified value, cplbegf.

The decoder converts the coupling channel back into individual channels by multiplying the coupled channel transform coefficient values by the coupling coordinate for that channel and frequency band. An additional processing step occurs where only two channels are coupled and phase flag bits are employed. In this case a phase-flag-in-use bit (phsflginu) is set in the encoded bit-stream, and phase restoration bits are retrieved from the bit-stream by the decoder in the form of phase flag bits. The phase flag bits are arranged to represent the coupling bands in a frequency ascending order. If a phase flag bit is set for a particular band, all of the right channel transform coefficients within the coupled band are negated (inverted) after modification by the coupling coordinate, but before inverse transformation.

Transform coefficients #r37 through #252 are grouped into 13 sub-bands of 12 coefficients each, as shown below in Table 1. The parameter cplbegf indicates the number of the coupling sub-band which is the first to be included in the coupling process. Below the frequency (or transform coefficient number, tc#) indicated by cplbegf all channels are independently coded. Above the frequency indicated by cplbegf, channels included in the coupling process share the common coupling channel, up to the frequency (or tc#) indicated by a parameter cplendf. The coupling channel is coded up to the frequency (or tc#) indicated by cplendf, which indicates the last coupling sub-band which is coded. The parameter cplendf is interpreted by adding 2 to its value, so the last coupling sub-band which is coded can range from 2–17.

| coupling sub-band# | low tc# | high tc# | If cutoff (kHz) @fs = 48 kHz | If cutoff (kHz) @fs = 48 kHz | If cutoff (kHz) @fs = 48 kHz | If cutoff (kHz) @fs = 48 kHz |
|---|---|---|---|---|---|---|
| 0 | 37 | 48 | 3.42 | 4.55 | 3.14 | 4.18 |
| 1 | 49 | 60 | 4.55 | 5.67 | 4.18 | 5.21 |
| 2 | 61 | 72 | 5.67 | 6.80 | 5.21 | 6.24 |
| 3 | 73 | 84 | 6.80 | 7.92 | 6.24 | 7.28 |
| 4 | 85 | 96 | 7.92 | 9.05 | 7.28 | 8.31 |
| 5 | 97 | 108 | 9.05 | 10.17 | 8.31 | 9.35 |
| 6 | 109 | 120 | 10.17 | 11.30 | 9.35 | 10.38 |
| 7 | 121 | 132 | 11.30 | 12.42 | 10.38 | 11.41 |
| 8 | 133 | 144 | 12.42 | 13.55 | 11.41 | 12.45 |
| 9 | 145 | 156 | 13.55 | 14.67 | 12.45 | 13.48 |
| 10 | 157 | 168 | 14.67 | 15.80 | 13.48 | 14.51 |
| 11 | 169 | 180 | 15.80 | 16.92 | 14.51 | 15.55 |

-continued

| coupling sub-band# | low tc# | high tc# | If cutoff (kHz) @fs = 48 kHz | If cutoff (kHz) @fs = 48 kHz | If cutoff (kHz) @fs = 48 kHz | If cutoff (kHz) @fs = 48 kHz |
|---|---|---|---|---|---|---|
| 12 | 181 | 192 | 16.92 | 18.05 | 15.55 | 16.58 |
| 13 | 193 | 204 | 18.05 | 19.17 | 16.58 | 17.61 |
| 14 | 205 | 216 | 19.17 | 20.30 | 17.61 | 18.65 |
| 15 | 217 | 228 | 20.30 | 21.42 | 18.65 | 19.68 |
| 16 | 229 | 240 | 21.42 | 22.55 | 19.68 | 20.71 |
| 17 | 241 | 252 | 22.55 | 23.67 | 20.71 | 21.75 |

The coupling channel sub-bands are combined in to coupling bands for which coupling coordinates are generated for each coupled channel (and included in the bit stream). The coupling band structure is indicated by a parameter cplbndstrc[sbnd]. Each bit of the cplbndstrc[ ] array indicates whether the sub-band corresponding to the index is combined into the previous (lower in frequency) coupling, band. Coupling bands are thus each structured based on an integral number of coupling channel sub-bands.

FIG. 1 diagrammatically illustrates the general coupling process. In this Figure, the Figure portions 1a to 1i illustrate diagrammatically the various frequency coefficients, coupling coordinates and phase flag values as functions of frequency over a portion of an encoding followed by decoding process. In a dual channel encoder, the input bit stream comprises interleaved digitised signals of two channels, the two individual channels hereinafter being identified as a (left channel) and b (right channel). The first step is to extract a block of the digitised samples, for both channel a and b, from the input stream and transform it to the frequency domain using filter banks, to generate frequency domain coefficients. The general frequency domain coefficients for channels a and b are hereinafter identified as sequences $a_i$ and $b_i$ (see FIGS. 1a and 1b), respectively, where the subscript i identifies the corresponding frequency sequence number of the coefficient.

A frequency point called $f_{cplbegf}$ (coupling begin frequency) is selected by the encoder based on the cplbegf parameter as outlined above. Frequency coefficients $a_i$ and $b_i$, for all i below $f_{cplbegf}$ are sent individually by the encoder into the compressed bit stream (see FIGS. 1c and 1h).

Frequency coefficients $a_i$ and $b_i$, for all i above $f_{cplbegf}$ are combined by a binary operator to generate a new channel called the coupling channel, c. Channels a and b which are used to form the coupling channel, are referred to as coupled channels. Any binary operator ($\oplus$) can be used for generation of the coupling channel, its exact nature not being specified by the AC-3 standard and independent of the phase determination strategy described herein. Thus, the method and apparatus described herein according to embodiments of the present invention, for estimation of phase reconstruction data, place no restriction on the coupling channel generation strategy.

The coupling channel, c, comprises frequency domain coefficients which are identified as $c_i = a_i \oplus b_i$. The coupling channel is sectioned into a number of consecutive bands (see FIG. 1e), the encoder controlling the coupling band structure (the bandwidth of each coupled band) as outlined above and described in the AC-3 standard. For each such band, and each coupled channel, a coupling co-ordinate value is generated by the encoder (see FIGS. 1d and 1f).

To restore the original channel coefficients $a_i$ or $b_i$ in a particular band, the decoder must multiply each coupling channel coefficient $c_i$ in that band by the coupling-coordinate value for that band and channel (see FIGS. 1d and 1e). For example, if $\psi$ is the coupling co-ordinate for a band in the coupled channel b, the coefficients estimate for b at the decoder, called $\hat{b}_i$, will be $$\hat{b}_i = \psi c_i \qquad \text{Eq. 1}$$

The encoder measures the original signal power in the band for the individual coupled channel, as well as the power in the coupling channel for the same band. The ratio of original signal power within a band to the coupling channel power in the same band is termed as the coupling co-ordinate for the band. However, once again, the phase estimation method described herein is independent of the coupling co-ordinate generation strategy.

In a dual channel encoder, for the second (right) channel i.e. channel b, a phase flag information is transmitted for each coupling band to allow phase correction at the decoder (see FIG. 1g). Therefore, Eq. 1 can be rewritten as $$\hat{b}_i = \text{phase\_flag} * \psi c_i \qquad \text{Eq. 2}$$

A difficulty is how to determine the phase flags. A simple approach could be to compute the sum of the channel b-coefficients in the band, i.e. $\Sigma b_i$, and also the sum of the coefficients in the band for the coupling channel, i.e. $\Sigma c_i$. If both the sums are of the same sign, then phase flag is set to +1, else if they are of opposite signs, then phase flag is set to −1. That is, $$\text{phase\_flag} = \text{sign}[(b_i) * (\Sigma c_i)] \qquad \text{Eq. 3}$$

However, this approach can lead to spurious results, and to gain insight into the functioning of the phase flag, a more detailed analysis is required.

Figure 2A:
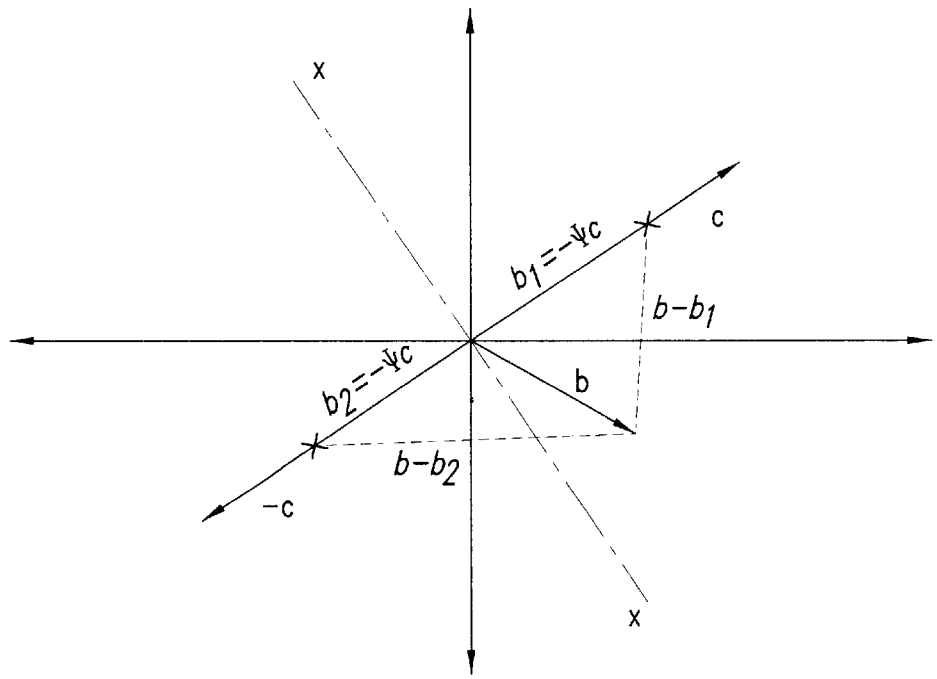
FIGS. 2a and 2b are vector space diagrams.
Figure 2B:
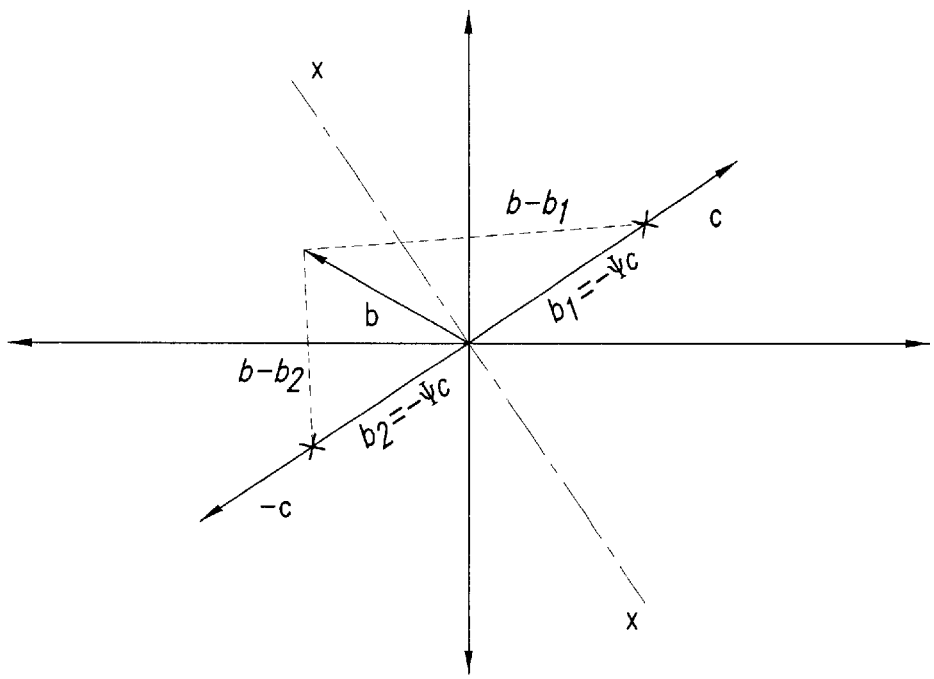

Channel coefficients for a particular band can be visualised as vectors, in a n-dimensional space, n being the number of frequency coefficient points in the band. Thus, $\vec{b} = (b_1, b_2, \ldots b_n$ and, $\vec{c} = (c_1, c_2, \ldots c_n)$. FIGS. 2a and 2b illustrate the vector space formed by the channel coefficients in a band. The estimate of vector $\vec{b}$ at decoder can be, $$\vec{b}_1 = \psi \vec{c} \qquad \text{Eq. 4}$$

or $$\vec{b}_2 = -\psi \vec{c} \qquad \text{Eq. 5}$$

depending whether phase flag is sent as +1 or −1, respectively.

In FIG. 2a, xx' is defined as the hyper-plane perpendicular to vector $\vec{c}$, dividing the n-dimensional vector space into two parts. When b ties on the same side of the hyper-plane as $\vec{c}$, then $\vec{b}_1$ is a better estimate of $\vec{b}$ than $\vec{b}_2$ (as in the case shown in FIG. 2a), i.e. $\|\vec{b} - \vec{b}_1\| < \|\vec{b} - \vec{b}_2\|$. Similarly, when $\vec{b}$ lies on opposite side of the hyper-plane as $\vec{c}$, then $\vec{b}_2$ is a better approximation than $\vec{b}_1$.

Adopting this approach, it is then apparent from FIGS. 2a and 2b that if the dot product (·) or the cosine of the angle between the vectors $\vec{b}$ and $\vec{c}$ is positive, i.e. the angle between them is less than 90°, then phase flag should be set as +1, otherwise it should be −1. A statement of the method can be expressed as follows:

$$\text{phase\_flag} = \text{sign}(\vec{b} \cdot \vec{c}) = \text{sign}(\Sigma(b_i * c_i)) \qquad \text{Eq. 6}$$

Having noted the geometric interpretation of the phase flag determination method, it is then possible to analyse it from the perspective of least-square-error between the original channel coefficient $b_i$ at encoder and the estimated channel coefficients $\hat{b}_i$ at decoder.

Assuming, sign$[\Sigma(b_i{}^*c_i)]=+1$, it is then necessary to show that $\psi c_i$ is a closer approximate than $-\psi c_i$. That is, $$\Sigma(b_i-\psi c_i)^2 < \Sigma(b_i+\psi c_i)^2 - [\Sigma b_i{}^2 - 2\psi\Sigma b_i c_i + \psi^2 \Sigma c_i{}^2] < [\Sigma b_i{}^2 + 2\psi\Sigma b_i c_i + \psi^2 \Sigma c_i{}^2]$$

Cancelling identical terms on both sides of the inequality, $2\psi\Sigma b_i c_i < 2\psi\Sigma b_i c_i$ $\Sigma b_i c_i > 0$ which is true under the assumption.

It can therefore be observed that Eq. 6, gives phase flag with guaranteed least-square-error between the original channel coefficients at encoder and the estimated channel coefficients at decoder.

In summary, assuming that the frequency coefficients within a particular coupling band are identified as:

$a_i$, for the first coupled channel, $b_i$, for the second coupled channel, $c_i$, for the coupling channel, and index i extends over the frequency range of the band. Then, the phase flag data for the coupling band can be computed according to:

$$\text{phase\_flag} = \text{sign}(\Sigma(b_i{}^*c_i)) \qquad \text{Eq. 7}$$

Note: the sign( ) function has the general interpretation, that is, it returns a+1 if the function parameter is a positive number and −1 if it is negative. For the case of zero, any value +1 or −1, can be considered as the signals are then essentially orthogonal (uncorrelated).

Figure 3:
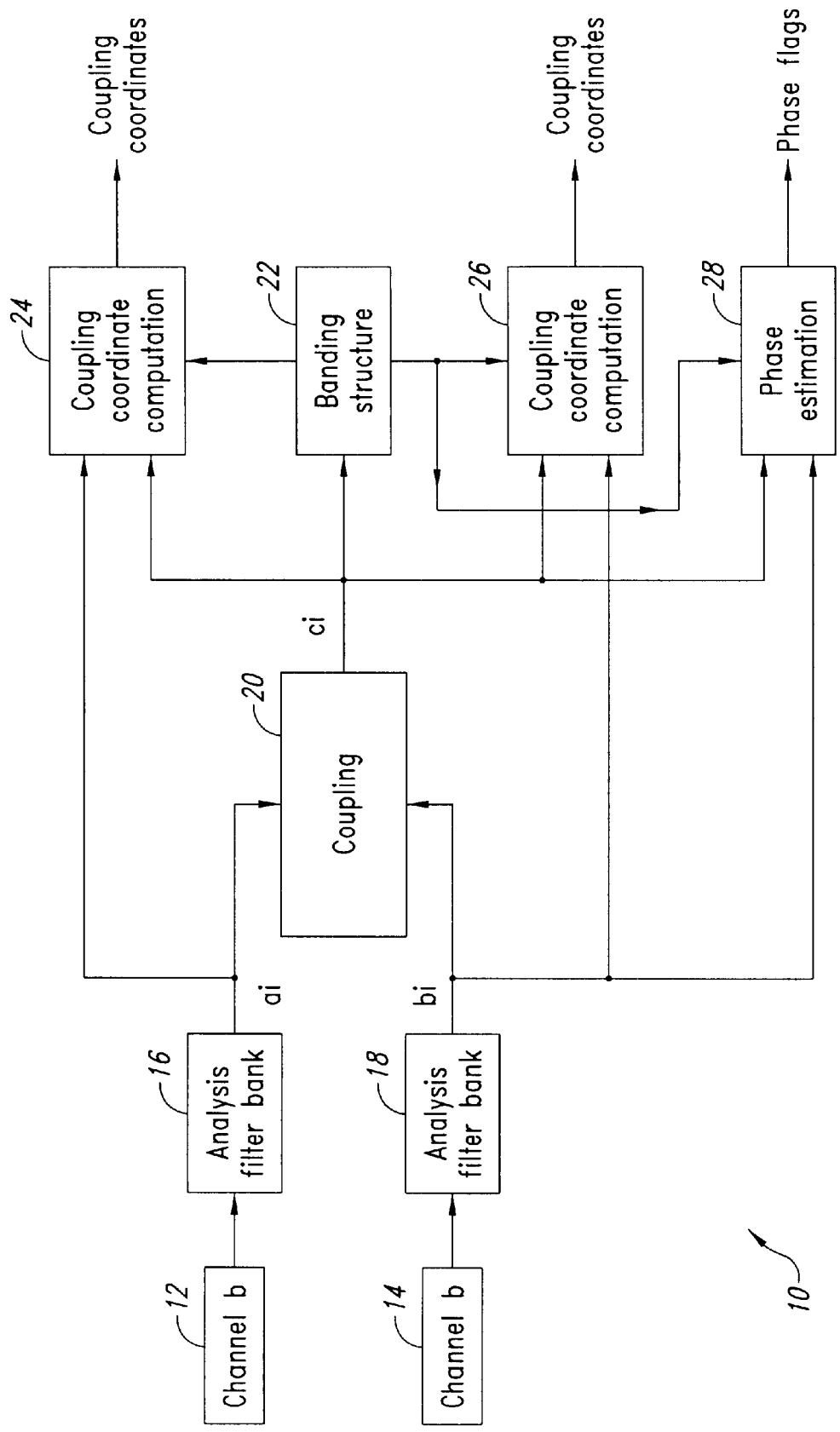
FIG. 3 is a block diagram of a dual channel audio encoder apparatus constructed according to an embodiment of the invention.

FIG. 3 is a block diagram showing a dual channel audio encoder apparatus 10 for implementing this phase estimation strategy. The encoder 10 receives PCM coded audio samples corresponding to left and right audio channels referred to as channel a (12) and channel b (14), respectively. The audio data from channels a and b are passed to respective analysis filter banks 16, 18 of conventional form, which transform the audio data into frequency domain transform coefficients $a_i$ and $b_i$. The transform coefficients are passed to a coupling processor 20 which generates coupling channel coefficients $c_i$.

The encoder 10 includes a coupling band determination processor 22, which determines how the bands in the coupling channel are structured according to predefined parameters (i.e. determines a correspondence between the coupling channel coefficients and the coupled channels' coupling coordinates). The banding structure processor 22 controls left and right channel coupling coordinate computation processors 24, 26. The coupling coordinate computation processors receive as input the coupling channel coefficients $c_i$ and the respective left or right channel transform coefficients $a_i$, $b_i$, and generate respective channel coupling coordinates according to the coupling band structure dictated by the banding structure processor 22.

A phase estimation processor 28 is also provided which receives as input the coupling channel coefficients $c_i$ and the right channel coefficients $b_i$. The phase estimation processor 28 is also controlled by the banding structure processor 22 so that the phase flags generated thereby correspond to the predefined frequency bands of the channel coupling coordinates. For each coupling channel frequency band the phase estimation processor computes a corresponding phase flag according to the operation outlined by Eq. 7, above. The phase flags are output to be included in the encoded bit stream along with the coupling channel coefficients $c_i$, and the left and right channel coupling coordinates.

The dual channel audio encoder apparatus 10 is preferably implemented as part of an application specific integrated circuit, in which case the functional blocks described above may comprise circuit portions which interact with one another under control of timing and control circuitry. Alternatively, however, the encoder apparatus may be implemented by a more general purpose data processing circuit such as a conventional microprocessor, and in that case the functions performed by the individual functional blocks as above described may all be performed by the same microprocessor circuit according to instructions defining the functions which are stored as, for example, micro-code.

The foregoing detailed description of embodiments of the invention have been presented by way of example only, and this description is not intended to be considered limiting to the invention as defined in the claims appended hereto.

What is claimed is:

1. A method for computing a phase reconstruction coefficient in a dual channel digital audio encoder having first and second encoded channels and a coupling channel, the method comprising:

computing transform coefficients for said first and second channels;

computing coupling coefficients from the transform coefficients of the first and second channels;

computing a dot product of the corresponding transform coefficients for one of the first and second channels and the coupling coefficients; and determining the sign of the computed dot product.

2. A method as claimed in claim 1, including computing a phase reconstruction coefficient for each of a plurality of coupling frequency bands for said one of the first and second channels.

3. A method as claimed in claim 1 which is independent of a method used for computing the coupling coefficients.

4. A method for computing a phase reconstruction coefficient in a dual channel digital audio encoder having first and second encoded channels and a coupling channel, the method comprising;

determining transform coefficients for one of the first and second channels;

determining coupling coefficients from the first and second channels; and computing the sign of the sum of corresponding transform and coupling coefficients over a predetermined frequency range of the coefficients.

5. A method as claimed in claim 4, including computing a plurality of phase reconstruction coefficients for different predetermined frequency bands.

6. A method as claimed in claim 4 which is independent of a method used for computing the coupling coefficients.

7. A method as claimed in claim 6 which is independent of a method used for computing coupling coordinates for said first and second channels.

8. A method for computing a phase reconstruction coefficient in a dual channel digital audio encoder having first and second encoded channels and a coupling channel, the method comprising:

receiving first and second PCM coded audio data samples corresponding to first and second audio channels and for transforming the audio data into respective first and second frequency domain transform coefficients;

receiving the transform coefficients and generating coupling channel coefficients;

receiving the coupling channel coefficients and structuring one or more frequency bands in the coupling channel according to predetermined parameters;

receiving the coupling channel coefficients and the first and second channel transform coefficients and generating respective first and second channel coupling coordinates as a function of the coupling band structure;

receiving the coupling channel coefficients and the channel transform coefficients of one of the first and second channels and generating a phase flag for each coupling channel frequency band such that the phase flags correspond to the predetermined frequency bands of the channel coupling coordinates; and including the phase flags in an encoded bit stream along with the coupling channel coefficients and the first and second channel coupling coordinates.

9. The method of claim 8 wherein generating a phase flag for each coupling channel frequency band is controlled by a means for structuring one or more frequency bands.

10. The method of claim 9 wherein generating a phase flag for each coupling channel frequency band includes computing a corresponding phase flag for each coupling channel frequency band according to: phase flag=sign($\Sigma(b_i {}^* c_i)$), where $b_i$ is the transform coefficient for one of the first and second coupled channels, and $c_i$ is the transform coefficient for the coupling channel.

11. The method of claim 9 wherein structuring the frequency bands in the coupling channel includes determining a correspondence between the coupling channel coefficients and the coupling coordinates of the respective first and second coupled channel.

12. A dual channel encoder for coding of audio information which generates a coupling channel with at least one coupling band, the encoder comprising:

means for computing a dot product of input channel transform coefficients and coupling channel coefficients in said at least one coupling band; and means for determining the sign of said dot product for use as a phase flag corresponding to the at least one coupling band.

13. A dual channel encoder for coding of audio information which generates a coupling channel and phase estimation data such that a difference between original coupled channel coefficients generated at the encoder and channel coefficients estimated at a compatible decoder have a least square error.

14. An encoder for transform coding digital audio information from first and second channels, the encoder comprising:

means for producing a coupling channel arranged in at least one frequency band and at least one phase flag corresponding to the at least one frequency band, wherein the at least one phase flag is computed according to:

phase flag=sign($\Sigma(b_i {}^* c_i)$), wherein:

$b_i$ represents transform coefficients for one of the first and second channels, $c_i$ represents transform coefficients for the coupling channel, and index i extends over the frequency range of the band.

15. A dual channel encoder comprising:

first and second analysis filter banks structured to receive PCM coded audio data samples corresponding to left and right audio channels and transform the audio data into respective first and second frequency domain transform coefficients;

a coupling processor coupled to receive the transform coefficients and generate coupling channel coefficients;

a banding structure processor coupled to receive the coupling channel coefficients and structure one or more frequency bands in the coupling channel according to predefined parameters;

left and right channel coupling coordinate computation processors coupled to receive the coupling channel coefficients and the respective left and right channel transform coefficients and generating respective left and right channel coupling coordinates as a function of the frequency band structure determined by the banding structure processor; and a phase estimation processor coupled to receive the coupling channel coefficients and the transform coefficients of one of the left and right channels, the phase estimation processor being structured to operate under control of the banding structure processor to generate a phase flag for each coupling channel frequency band such that the phase flags correspond to the predefined frequency bands of the channel coupling coordinates, the phase flags being included in an encoded bit stream along with the coupling channel coefficients and the left and right channel coupling coordinates.

16. The encoder of claim 15 wherein the phase estimation processor computes a corresponding phase flag for each coupling channel frequency band according to: phase flag=sign($\Sigma(b_i {}^* c_i)$), where $b_i$ is the transform coefficient for one of the left and right coupled channels, and $c_i$ is the transform coefficient for the coupling channel, and index i extends over the frequency range of the band.

17. The encoder of claim 15 wherein the banding structure processor structures the one or more frequency bands in the coupling channel by determining a correspondence between the coupling channel coefficients and the coupling coordinates of the respective left and right coupled channel.

* * * * *